United States Patent [19]

Wiedner et al.

[11] Patent Number: 4,948,306
[45] Date of Patent: Aug. 14, 1990

[54] DRILL

[75] Inventors: Karl Wiedner, Ingelfingen, Fed. Rep. of Germany; Katsumi Shinjo, Osaka, Japan

[73] Assignee: Aldof Wurth GmbH & Co. KG, Fed. Rep. of Germany

[21] Appl. No.: 229,568

[22] Filed: Aug. 5, 1988

[30] Foreign Application Priority Data

Aug. 8, 1987 [DE] Fed. Rep. of Germany ... 8710882[U]
Apr. 26, 1988 [JP] Japan ................. 63-103358

[51] Int. Cl.⁵ ......................................... B23B 51/02
[52] U.S. Cl. ..................................... 408/227; 408/229
[58] Field of Search ............... 408/199, 227, 228, 229, 408/230

[56] References Cited

U.S. PATENT DOCUMENTS

| 500,213 | 6/1893 | Richards | 408/229 |
| 2,034,514 | 3/1936 | Hayden et al. | 51/288 |
| 2,354,985 | 8/1944 | Davis | 408/228 |
| 4,781,506 | 11/1988 | Roberts et al. | 408/230 |

FOREIGN PATENT DOCUMENTS

| 2244159 | 3/1973 | Fed. Rep. of Germany . | |
| 3142943 | 6/1982 | Fed. Rep. of Germany | 408/199 |
| 912392 | 2/1945 | France . | |
| 1275673 | 10/1961 | France | 408/230 |
| 2299941 | 9/1976 | France . | |
| 2382965 | 11/1978 | France | 408/230 |
| 373245 | 12/1963 | Switzerland | 408/199 |
| 2025810 | 1/1980 | United Kingdom . | |
| 2100628 | 1/1983 | United Kingdom | 408/199 |

*Primary Examiner*—Daniel W. Howell
*Attorney, Agent, or Firm*—Eckert Seamans Cherin & Mellott

[57] ABSTRACT

A drill has a solid material shank (10), which is provided in its front region with a cold-forged drill point (11) with two cutting edges (12) approximately parallel to one another in projection and two flutes (13) running approximately in the longitudinal direction of the shank (10).

12 Claims, 2 Drawing Sheets

DRILL

BACKGROUND OF THE INVENTION

1. Field of the Invention

The invention relates to a drill with a drill shank and a bit, as well as a method for the manufacture thereof.

2. Prior Art

Drills for drilling metal are normally twist drills. The latter have a drill point, which has two bent bits, upstream of which are located flutes. The flutes extend helically over a considerable portion of the length of the drill shank. These twist drills are difficult to manufacture and require grinding after manufacture. Both the main cutting edges at the tip and the lateral secondary cutting edges adjacent to the flutes must be ground. Twist drills are expensive due to the complicated manufacture.

For some time now sheet metal has been used to an ever increasing extent in various branches of industry and even in those branches where the use of sheet metal has long been standard, the subsequent drilling of in particular small holes is becoming more common. Conventionally twist drills are used for this purpose. When they have become blunt, it is possible to regrind twist drills. However, this is generally only possible in workshops, the grinding equipment being unavailable to fitters or manual workers. Thus, frequently twist drills are thrown away instead of being reground. In addition, the small twist drills frequently break off in rough use.

SUMMARY OF THE INVENTION

An object of the present invention is to provide a metal drill, which has a simple construction and can be very inexpensively manufactured. According to the invention this object is achieved by a drill, which inventively has a cold-forged drill point with two cutting edges approximately parallel to one another in projection and two facing flutes approximately in the longitudinal direction of the drill, as well as a solid shank. As a result of the simple manufacture of the drill tip by forging, the drill can be very inexpensively manufactured. Thus, for the manufacture thereof, the front area of the shank only has to be forged in a single operation with the aid of a mold and this leads to the drill point.

Such drill points are known in connection with drill screws. However, the problems occurring with the latter are different than those encountered with drills. Thus, drill screws are only intended to be used once, whereas drills should have a long service life. In addition, no attention is required in the case of drill screws to the exactness of the drill hole, because the latter is subsequently deformed during the thread forming process. It has now surprisingly been found that the bits known in connection with self-drilling screws are also suitable for drills.

According to a further development, the transverse dimension of the drill point can be larger in a direction parallel to the cutting edges than the transverse dimension in a direction at right angles thereto. This makes it possible to reduce to a minimum rubbing against the drill hole wall.

According to a further development, the maximum transverse dimension of the drill point is larger than the drill shank diameter. This measure is not known in connection with twist drills, because the latter have a land adjacent to the flutes which leads to an all-side engagement on the drill hole.

It is particularly advantageous if the cross-section through the drill point has the form of two laterally displaced, mirror-inverted trapeziums or trapezoids, whose longer sides form the cutting edges. Such a bit is known in connection with a self-drilling screw from German patent 31 26 355. This bit is particularly suitable for the drill proposed by the invention.

According to a further development, the secondary cutting edges formed by the flutes can run parallel to the longitudinal axis of the drill shank. It is particularly advantageous if the flute faces upstream of the cutting edges are hollowed out.

For the manufacture of the drill, the invention proposes that a cylindrical shank, preferably made from steel with a low carbon content, is cold-forged in its one end region for the formation of a drill point. This can in particular take place with the aid of a split mold. It is also possible for the shank to have in its fixing area or in its central area a thickened flange, which is knurled during manufacture. When carrying out knurling, there is a simultaneous removal of the burrs formed during the forging of the drill point.

BRIEF DESCRIPTION OF THE DRAWINGS

Further features, details and advantages of the invention can be gathered from the following description of a preferred embodiment of the invention with reference to the drawing, wherein are shown.

DETAILED DESCRIPTION OF THE PREFERRED EMBODIMENTS

Figure 1:
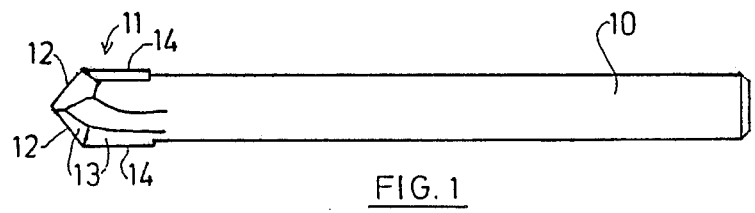
FIG. 1: A side view of a drill proposed by the invention.

The drill shown in FIG. 1 has a drill shank 10 provided at its front end with a drill point 11. The latter has a small axial length, which is dimensioned in such a way that it is somewhat larger than the thickness of the material to be drilled. The width, i.e. the transverse extension of the drill point is somewhat larger than the diameter of the drill shank 10. With the exception of the drill point 11, the drill shank 10 is completely solidly constructed, i.e. it has no flutes.

The drill point 11 has two main cutting edges 12 which, seen from the side and as shown in FIG. 1, form an angle of approximately 105°. A flute 13 is provided in the rotation direction upstream of each main cutting edge 12, only one of these visible in FIG. 1. The flute 13 runs roughly in the longitudinal direction of drill shank 10. Its radial outer edge in each case forms a secondary cutting edge 14 connected to the main cutting edge 12.

Figure 2:
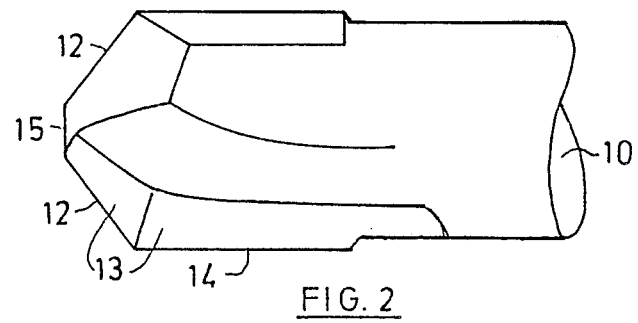
FIG. 2: On a larger scale, a side view of the drill point.

Details of the drill point can be more clearly gathered from FIG. 2. The flutes 13 adjacent to the main cutting edges initially slope somewhat and then pass into a purely axial direction. A tool tip 15 shown in FIG. 2 can be formed between the two main cutting edges 12.

Figure 3:
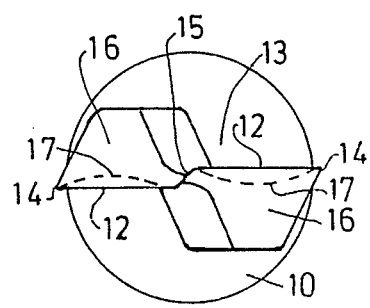
FIG. 3: A plan view of the drill from the left in FIGS. 1 and 2.

The special shape of the drill point can be gathered from FIG. 3, which is a plan view thereof. The cross-sectional shape is formed by two trapeziums 16, which with respect to their longer sides are arranged in mirror-inverted manner and are laterally displaced.

The longer sides of the trapeziums in each case form the main cutting edges 12. Both the main cutting edges 12 are linear and in the projection of FIG. 3 parallel to one another, but are somewhat reciprocally displaced. The flute faces 17, which bound the flutes 13 on one side are hollowed out somewhat, the cavity axis passing in the longitudinal direction of drill shank 10.

The reciprocal spacing of the two secondary cutting edges 14, i.e. the maximum transverse extension of the drill point 11 is somewhat greater than the diameter of drill shank 10. As a result of this fact and the trapezium shape of the cross-section of the drill point, rubbing against the edge of the drill hole is prevented.

The drill proposed by the invention is e.g. intended for producing the holes for blind riveted joints for which purpose a more robust and inexpensive drill is required. It has been found that the drill point produced by cold-forging can be used for at least 200 to 300 drilling operations.

Figure 4:
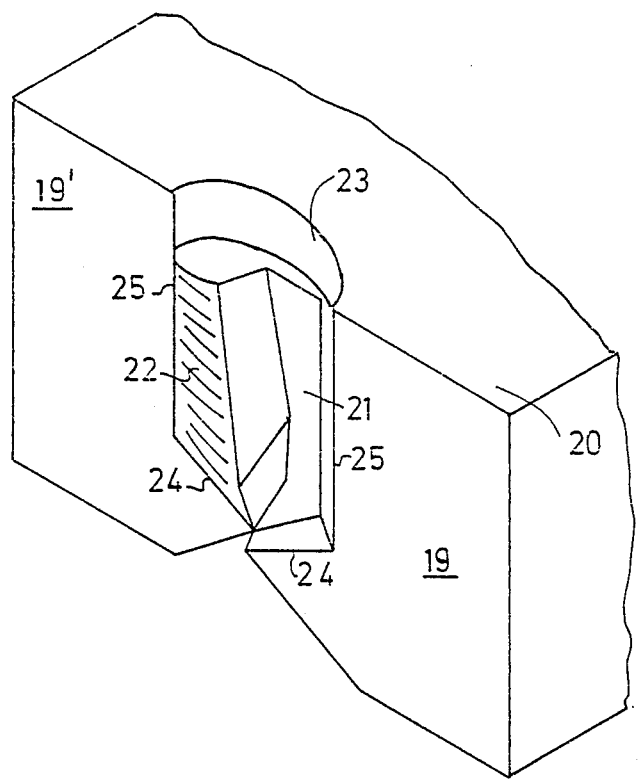
FIG. 4: A view of a mould for producing a drill.

FIG. 4 shows part of a split mold for producing the drill point. The mold comprises two symmetrically constructed mold parts 20, whereof only one is visible in FIG. 1. Mold part 20 has two cutting surfaces 19 and 19', which are parallel to one another, but whereof the cutting surface 19' is slightly set back with respect to the cutting surface 19. As can be gathered from FIG. 4, mold half 20 has a mold cavity in which there are a protuberance 22 and depressions 21 and 23. Depression 21 is concave with respect to the plane of cutting surface 19. Protuberance 22 is convex with respect to the cutting surface 19'. Cutting edge 12 and cutting edge 14 are formed by edges 24 and 25, which form the opening of the mold cavity. Edges 24 and 25 are provided on the cutting surfaces 19 and 19'. A semicircular recess 23 is made in such a way that it secures the original cylindrical shank 10, when the latter is exposed to a compression force in the mold.

I claim:

1. A drill with a solid shank and a drilling bit, the drilling bit having two primary cutting edges, two flutes and two secondary cutting edges, the primary edges being in projection substantially parallel to one another and forming a drill point with a tip angle as seen from a direction perpendicular to the shank, the flutes extending alongside the drilling bit substantially in the longitudinal direction of the drill and being arranged diametrically opposite one another, each flute forming one of the secondary cutting edges, wherein a transverse dimension of the drill point defined by a distance between the secondary cutting edges in a direction parallel to a direction of projection of the primary cutting edges is greater than a corresponding transverse dimension in a direction transverse thereto, and wherein a tip of the drill adjacent the drill point has a maximum transverse dimension greater than a diameter of the solid shank.

2. The drill according to claim 1, wherein the secondary cutting edges formed by the flutes are parallel to a longitudinal axis of the solid shank.

3. The drill according to claim 1, wherein the flutes have hollowed-out flute faces in front of said cutting edges.

4. A drill with a solid shank and a drilling bit, the drilling bit having two primary cutting edges, two flutes and two secondary cutting edges, the primary edges being in projection substantially parallel to one another and forming a drill point with a tip angle as seen from a direction perpendicular to the shank, the flutes extending alongside the drilling bit substantially in the longitudinal direction of the drill and being arranged diametrically opposite one another, each flute forming one of the secondary cutting edges, wherein a cross section through the drill point defines two laterally displaced mirror-inverted trapeziums with two parallel sides, one said side being larger than the other, the longer sides of the two trapeziums forming the primary cutting edges.

5. The drill according to claim 4, wherein the secondary cutting edges formed by the flutes are parallel to a longitudinal axis of the solid shank.

6. The drill according to claim 4, wherein the flutes have hollowed-out flute faces in front of said cutting edges.

7. A drill with a solid shank and a drilling bit, the drilling bit having two primary cutting edges, two flutes and two secondary cutting edges, the primary edges being in projection substantially parallel to one another and forming a drill point with a tip angle as seen from a direction perpendicular to the shank, the flutes extending alongside the drill bit substantially in the longitudinal direction of the drill and being arranged diametrically opposite one another, each flute forming one of the secondary cutting edges, the primary cutting edges and the flutes defining the drilling bit being at least partly deformed outwardly from the solid shank adjacent the drill point of the drill.

8. The drill according to claim 7, wherein a transverse dimension of the drill point defined by a distance between the secondary cutting edges in a direction parallel to a direction of projection of the primary cutting edges is greater than a corresponding transverse dimension in a direction transverse thereto.

9. The drill according to claim 8, wherein a tip of the drill adjacent the drill point has a maximum transverse dimension greater than a diameter of the solid shank.

10. The drill according to claim 7, wherein a cross section through the drill point defines two laterally displaced mirror-inverted trapeziums with two parallel sides, one said side being larger than the other, the longer sides of the two trapeziums forming the primary cutting edges.

11. The drill according to claim 7, wherein the secondary cutting edges formed by the flutes are parallel to a longitudinal axis of the solid shank.

12. The drill according to claim 7, wherein the flutes have hollowed-out flute faces in front of said cutting edges.

* * * * *

UNITED STATES PATENT AND TRADEMARK OFFICE
CERTIFICATE OF CORRECTION

PATENT NO. : 4,948,306

DATED : August 14, 1990

INVENTOR(S) : Weidner et al

It is certified that error appears in the above-identified patent and that said Letters Patent is hereby corrected as shown below:

On the title page, in items [19] and [75] the inventors last name "Wiedner" should read --Weidner--; and
item [73] Assignee: "Aldof Wurth Gmbh & Co. KG." should read --Adolf Wurth Gmbh & Co. KG.--.

Signed and Sealed this

Eleventh Day of August, 1992

Attest:

DOUGLAS B. COMER

Attesting Officer

Acting Commissioner of Patents and Trademarks